Feb. 17, 1953 F. S. SCHRAGE 2,628,701
CONVEYER

Filed April 30, 1949 3 Sheets-Sheet 1

INVENTOR.
F. S. SCHRAGE
BY
Merrill M. Blackburn.
ATTORNEY

Feb. 17, 1953 F. S. SCHRAGE 2,628,701
CONVEYER
Filed April 30, 1949 3 Sheets-Sheet 2

INVENTOR.
F. S. SCHRAGE
BY
Merrill M. Blackburn
ATTORNEY

Feb. 17, 1953  F. S. SCHRAGE  2,628,701
CONVEYER
Filed April 30, 1949  3 Sheets-Sheet 3
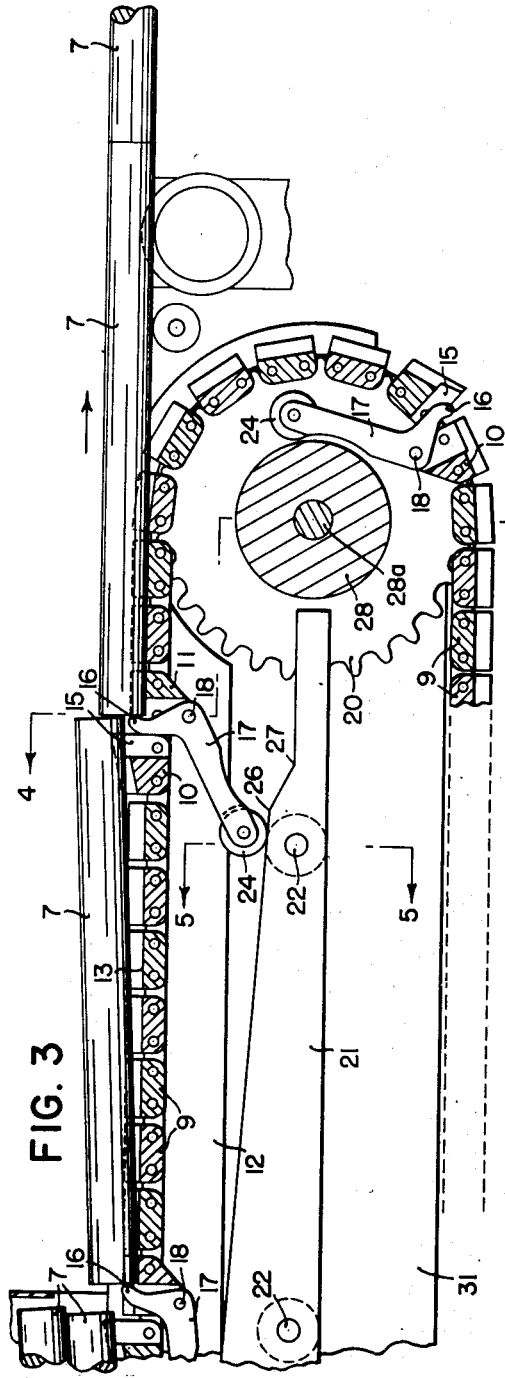
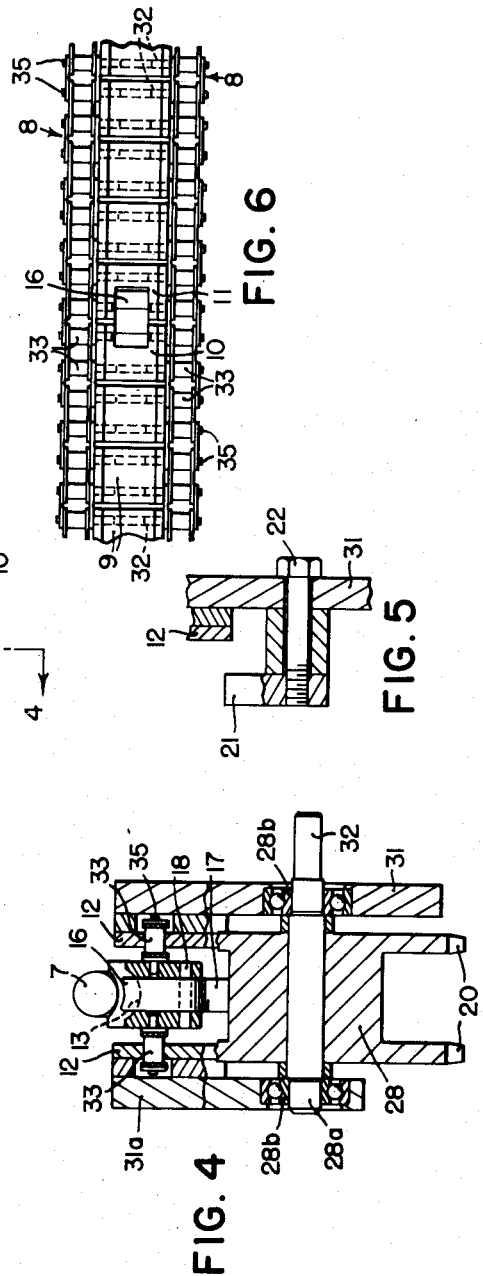
INVENTOR.
F. S. SCHRAGE
BY Merrill M. Blackburn
ATTORNEY Patented Feb. 17, 1953

2,628,701

UNITED STATES PATENT OFFICE 2,628,701

CONVEYER

Frederick S. Schrage, Rock Island, Ill., assignor to Mutual Engineering Company, Inc., Davenport, Iowa, a corporation of Iowa Application April 30, 1949, Serial No. 90,584

8 Claims. (Cl. 198—25)

The present invention relates to mechanism for uniformly feeding selected forms of substantially identical dimensions into and through a processing apparatus in which the rate of feed must be accurate, or reasonably so. At the present time, this apparatus is intended primarily for use in feeding shafts of substantially uniform dimensions into an induction hardening unit and feeding such shafts through the hardening unit at a substantially constant rate in order that the hardening may be properly accomplished. It is of course clear that it can be used for other purposes in which a uniform feed of objects of substantially uniform size may be desired.

In the drawings annexed hereto and forming a part hereof,

Fig. 3 shows a continuation of the structure of Fig. 2 in longitudinal section, Figs. 2 and 3 showing part of the structure of Fig. 1 on a somewhat larger scale;

Fig. 4 represents a vertical transverse section substantially along the broken plane indicated by the line 4—4, Fig. 3;

Fig. 5 represents a fragmentary transverse section substantially along the plane indicated by the line 5—5, Fig. 3;

Fig. 6 represents a fragmentary plan view of a part of the conveyor belt by means of which the shafts are fed through the machine; and Fig. 7 represents a fragmentary transverse section of the lower end of the feeding chute, showing in elevation a feed-regulating star-wheel.

Figure 1:
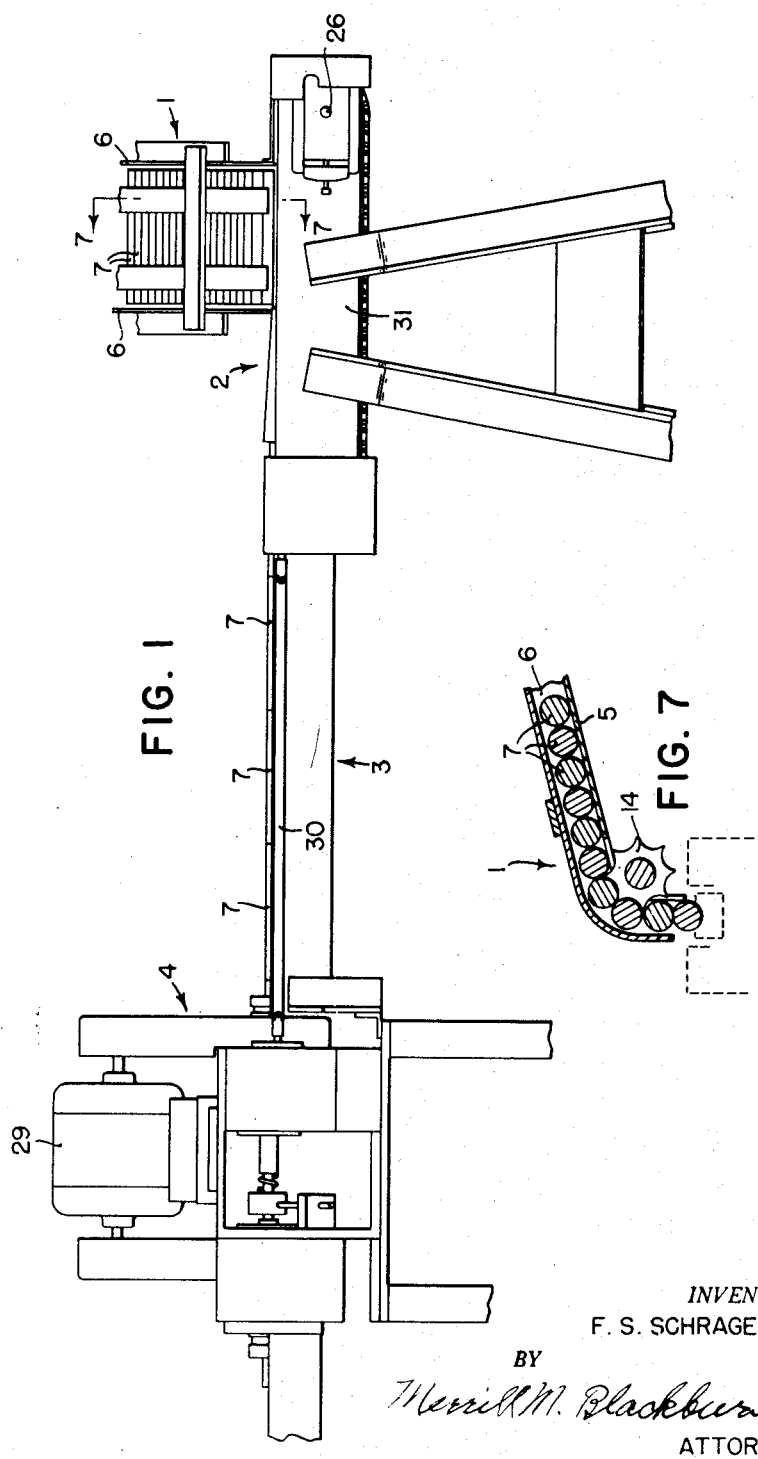
Fig. 1 shows a fragmentary elevation of the present construction connected to an induction hardening unit in treating relation and showing the feeding of shafts of uniform dimension from the feeding mechanism to the hardening mechanism.
Figure 2:
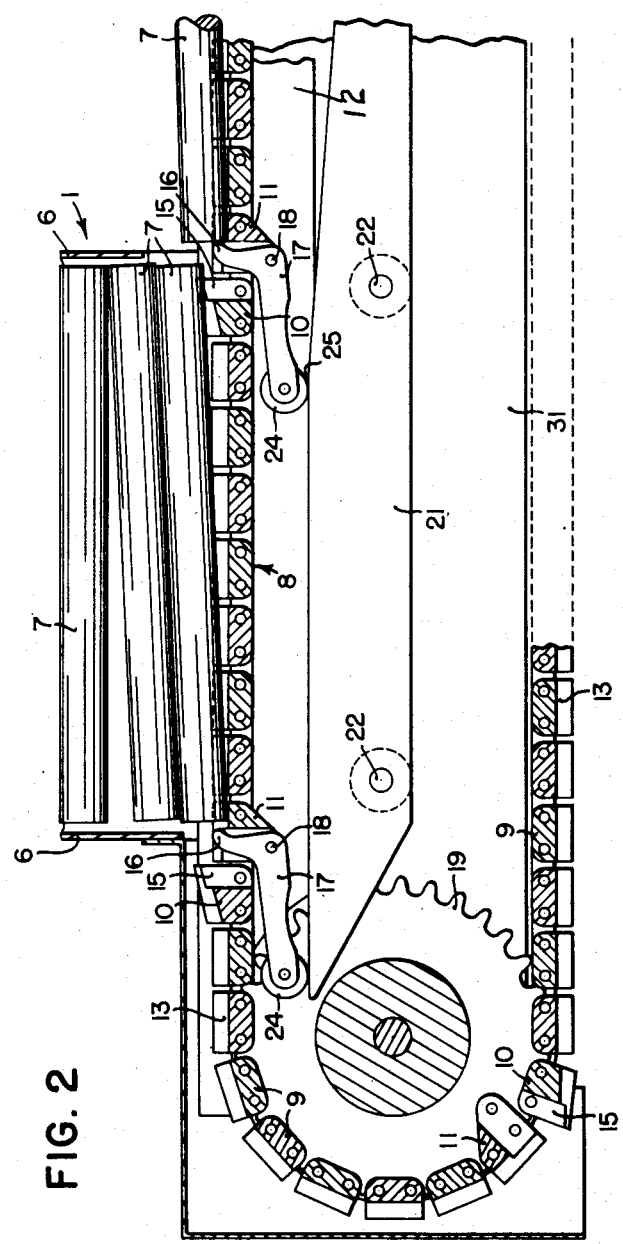
Fig. 2 shows a longitudinal section of the feeding mechanism with parts of the conveyor and the supply chute broken away.

Reference will now be made in greater detail to the annexed drawings for a more complete description of this invention. Essentially, Fig. 1 shows a feed hopper or chute 1, a feeding means 2, a conveyor 3, and an induction hardening unit 4. The feeding chute 1, having a bottom 5 and side walls 6, is shown as feeding a plurality of shafts 7, serially, down the inclined bottom into the feeding unit 2. The side walls 6 of the chute tend to keep the shaft 7 in alignment as they move toward the chute so that they will drop into proper position on the conveyor belt 8. This belt is made up of a number of blocks 9, 10, and 11, held together by links 12. As shown in Fig. 2, these various blocks are provided in their upper surfaces with grooves 13 which, collectively, furnish a channel in the upper surface of the conveyor belt for the reception of the shafts 7.

Adjacent each side of the chute 1 is a starwheel 14 for feeding the shafts 7 downwardly into the trough in the conveyor belt. These starwheels 14 are so positioned as to allow two shafts 7 to drop, a third shaft being retained in elevated position. However, the forward ends of the two lower shafts are held up by a prop 15 secured to the block 10 whereby to keep the forward ends of the two lower shafts 7 high enough to miss the nose 16 of the arm 17 which, during operation, as explained hereinafter, turns backwardly around its pivot 18. These pivots 18 are spaced a little farther apart than the length of the shafts. If shafts or other bodies of different lengths are to be fed by this mechanism, the number of blocks between a pair of blocks 11 may have to be adjusted to get the right length of belt between a pair of pivots 18, or a belt with blocks of a different size may be used. For supporting the conveyor belt, there is at one end a pair of free sprockets 19 and at the other end a pair of driven sprockets 20, around which sprockets the belt 8 travels. Between these sprockets is a cam 21 which is held in place by a plurality of bolts 22 which serve to hold the cam in fixed position in the housing of the unit 2. The arms 17 have rollers 24, pivotally mounted in one end thereof, and these rollers ride on the upper face of the cam 21. When a roller 24 reaches the point 25, it begins to lower and continues to lower at the same rate until it reaches the point 26 when it lowers much more rapidly until it reaches the point 27, at which time it stops lowering. As the arm 17 lowers, the nose 16 is withdrawn from the end of the shaft 7 until that shaft contacts with the forward end of the next succeeding shaft 7, as shown in Fig. 3. The shafts 7 on the conveyor 3 are utilized as the force transmitting means for moving the shafts into and through the hardening unit 4.

While the machine illustrated in the present drawing is one built to handle shafts eight and five-eighths inches (8⅝") long by three-fourths inch (¾") in diameter, it will be understood that this was constructed to take care of shafts of a particular type for a particular purpose. To take care of objects of a different size, the conveyor belt must be of a size to fit the particular use to be made of it.

As is clear from Fig. 4, the pairs of sprockets 19 and 20 are connected by a central body 28 so that they are, in general, spool-shaped, being supported on shafts 28a which are mounted in ball bearings 28b. This insures easy rotation of the sprockets 19 and 20 and substantial elimination of the drag against the motor 29 which furnishes the motive force for driving the apparatus. The motor 29 has driving connection with the shaft 30 by means of which the sprockets 20, belt 8, and sprockets 19 are driven for causing the transportation of the shafts 7 on the transporting unit and feeding them into the unit 4 to be processed. In order to prevent the belt or chain 8 from feeding two shafts at a time out of the chute 6, a lateral wall thereof extends down nearly to the bottom of the shaft which is next to the bottom shaft, thus preventing same from sliding out of the chute with the bottom shaft 7. Then, when the bottom shaft is fed clear of the chute, the next shaft is dropped upon the top of the belt, and its longitudinal travel on the belt begins at once. In this way, the bottom shaft is stripped from the one just above it by the conveyor belt.

As shown in Fig. 4, one end of each shaft 28a extends beyond a side wall 31, as shown at 32, and these shafts 28a are mounted in bearings 28b positioned in frame members 31 and 31a and thereby serve as supports for the sprockets 19 and 20 and bodies 28. Chains 8, comprising links 12 and pins 32, surrounded by sleeves 33, are connected to the blocks 9, 10, and 11, as stated above, and hold the parts in operative position so that the conveyor can carry the shafts to the hardening unit 4. The unit 3, connecting the units 2 and 4, is a transfer conveyor unit serving to keep the shafts 7 in alignment in their travel from the feeding unit to the processing or hardening unit. In some cases, this unit is not necessary, the feeding and processing units being closely coupled.

The hardening unit 4 has a hole extending through one wall thereof for the reception of the shafts 7 as they are fed forwardly at a substantially uniform rate of speed by the feeder belt 8. Bushings of various sizes may be placed in this hole to take care of shafts of various sizes and hold them approximately centered in the hole.

It is of course understood that the specific description of structure set forth above may be departed from without departing from the spirit of this invention as disclosed in the foregoing specification and as defined in the appended claims.

Having now described my invention, I claim:

1. In a conveyor, a pair of endless chains running over pairs of sprockets, said chains comprising links, blocks connecting corresponding links to form a conveyor element, equally spaced elements of the conveyor projecting beyond the outermost surface thereof, elements of the conveyor adjacent the first mentioned elements projecting inwardly beyond the innermost surface of the conveyor, an arm pivoted on each of the inwardly projecting elements and having a nose projecting beyond the outermost surface of the conveyor, a cam between the upper and lower runs of the conveyor, said arms having lever arms riding on the cam whereby to cause the nose on each arm to be retracted as the lever arms are lowered by moving over the cam, and carrying means in line with the carrying surface of the conveyor, whereby to furnish a low resistance carrier for carried elements after they leave the conveyor and are pushed ahead by the carried elements on the conveyor.

2. A structure as defined by claim 1, in combination with means for dropping bars to be conveyed on the surface of the conveyor.

3. A structure as defined by claim 1 in which the nose of each arm projects beyond the outer surface of the conveyor to serve as a stop for articles being carried by the conveyor to restrict rearward slipping of said articles, and the equally spaced elements of the conveyor project beyond the outer surface of the conveyor to support the forward end of the article being conveyed by the conveyor, whereby to keep substantially all of the surface of the article being conveyed out of contact with the conveyor as it goes across the conveyor.

4. A conveyor comprising an endless belt of connected blocks, said blocks being concaved on their outer surface, equally spaced ones of said blocks projecting beyond the outer surface of the belt whereby to hold conveyed objects out of contact with the belt except where held away by the equally spaced blocks, others of said blocks adjacent the equally spaced blocks projecting inwardly beyond the inner surface of the belt and carrying levers, each having a nose projecting outwardly beyond the outer surface of the belt to serve as driving means for articles to be conveyed and having inwardly projecting arms, and a cam located between the upper and lower runs of the conveyor, and having a surface substantially parallel to the belt, said cam having another surface contacted by the levers, said other surface being inclined to the surface of the belt.

5. A conveyor comprising an endless belt and a plurality of aligned rollers, said belt having a substantially horizontal run for conveying shafts to the rollers, and comprising an assembly of similar blocks and connecting links, the blocks being divided into groups of substantially equal length, each of said groups being terminated by a block projecting outwardly beyond the outer surface of the belt, and the rollers being aligned with the upper surface of the horizontal run of the belt.

6. A structure as defined by claim 5 having a container for dropping similarly shaped shafts on the belt.

7. A structure as defined by claim 6 having a star wheel for limiting the number of shafts which can be dropped at one time.

8. A structure as defined by claim 5 in which the shafts are aligned with the length of the belt, the receiving surface of the belt being grooved whereby to hold the shafts aligned with the belt.

FREDERICK S. SCHRAGE.

REFERENCES CITED

The following references are of record in the file of this patent:

UNITED STATES PATENTS

| Number | Name | Date |
| --- | --- | --- |
| 808,067 | Briggs | Dec. 26, 1905 |
| 857,427 | Waldron | June 18, 1907 |
| 936,026 | Palmowsky | Oct. 5, 1909 |
| 976,483 | Mitchell | Nov. 22, 1910 |
| 1,116,406 | Fleischer | Nov. 10, 1914 |
| 1,290,163 | Fuchs | Jan. 7, 1919 |
| 1,756,584 | Cope | Apr. 29, 1930 |
| 1,983,551 | Lindberg | Dec. 11, 1934 |